(12) United States Patent
Novaes

(10) Patent No.: US 7,117,434 B2
(45) Date of Patent: Oct. 3, 2006

(54) GRAPHICAL WEB BROWSING INTERFACE FOR SPATIAL DATA NAVIGATION AND METHOD OF NAVIGATING DATA BLOCKS

(75) Inventor: Marcos Nogueira Novaes, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 677 days.

(21) Appl. No.: 09/893,788

(22) Filed: Jun. 29, 2001

(65) Prior Publication Data

US 2003/0004995 A1    Jan. 2, 2003

(51) Int. Cl.
G06F 15/00    (2006.01)

(52) U.S. Cl. .............................. 715/513; 707/3; 707/5

(58) Field of Classification Search ............... 715/513, 715/854; 707/3, 100; 345/619
See application file for complete search history.

(56) References Cited

U.S. PATENT DOCUMENTS

| | | | |
|---|---|---|---|
| 2,923,845 A | 2/1960 | Zunick et al. | |
| 5,499,360 A | 3/1996 | Barbara et al. | |
| 5,923,845 A | 7/1999 | Kamiya et al. | |
| 5,991,796 A | 11/1999 | Anupam et al. | |
| 6,012,053 A * | 1/2000 | Pant et al. ...................... | 707/3 |
| 6,078,948 A | 6/2000 | Podgorny et al. | |
| 6,115,718 A | 9/2000 | Huberman et al. | |
| 6,233,571 B1 | 5/2001 | Egger et al. | |
| 6,243,755 B1 | 6/2001 | Takagi et al. | |
| 6,272,507 B1 | 8/2001 | Pirolli et al. | |
| 6,430,558 B1 | 8/2002 | Delano | |
| 6,463,426 B1 * | 10/2002 | Lipson et al. ................... | 707/3 |
| 6,480,841 B1 | 11/2002 | Higashio et al. | |
| 6,513,041 B1 | 1/2003 | Tarin | |
| 6,581,056 B1 | 6/2003 | Rao | |
| 6,583,800 B1 * | 6/2003 | Ridgley et al. ............. | 715/854 |
| 6,598,054 B1 | 7/2003 | Schuetze et al. | |
| 6,629,097 B1 | 9/2003 | Keith | |
| 6,631,372 B1 | 10/2003 | Graham | |
| 6,674,445 B1 * | 1/2004 | Chithambaram et al. ... | 345/619 |
| 2002/0016787 A1 | 2/2002 | Kanno | |
| 2002/0042793 A1 | 4/2002 | Choi | |
| 2002/0143932 A1 | 10/2002 | Quintero et al. | |
| 2002/0194158 A1 | 12/2002 | Stensmo | |
| 2003/0005038 A1 | 1/2003 | Codella et al. | |
| 2003/0009467 A1 * | 1/2003 | Perrizo ....................... | 707/100 |
| 2003/0074368 A1 | 4/2003 | Schuetze et al. | |
| 2003/0130998 A1 | 7/2003 | Fox et al. | |
| 2003/0217079 A1 | 11/2003 | Bakalash et al. | |
| 2005/0192957 A1 | 9/2005 | Newbold | |

OTHER PUBLICATIONS

Leung et al. Efficient Matching fir State-Persistent Publish/Subscribe System Published by IBM Canana Ltd Oct. 2003, pp. 1-15.*
Soumen Chakrabarti, et al., "Enhanced Hypertext Categorization Using Hyperlinks", International Conference on Management data, 1998 ACM SIGMOD, pp. 307-318.
Jackie Assa, et al., "Displaying data in multidimensional relevance space with 2D visualization maps", IEEE Visualization, 1997 IEEE, pp. 127-134.
Hoy-Jung Oh, et al., "A practical Hypertext Categorization Method using Links and Incrementally Available Class Information", Annual ACM Conference on Research, 2000 ACM, pp. 264-271.

* cited by examiner

Primary Examiner—William Bashore
Assistant Examiner—Quoc A. Tran
(74) Attorney, Agent, or Firm—Mark Wardas, Patent Agt.; McGinn IP Law Group, PLLC

(57) ABSTRACT

A Graphical User Interface (GUI) (and method for navigating data blocks) includes a display window, and a retrieval object displayed on the display window for assisting a user in retrieving data which is spatially organized in N-dimensions and displaying the data on the window.

28 Claims, 10 Drawing Sheets

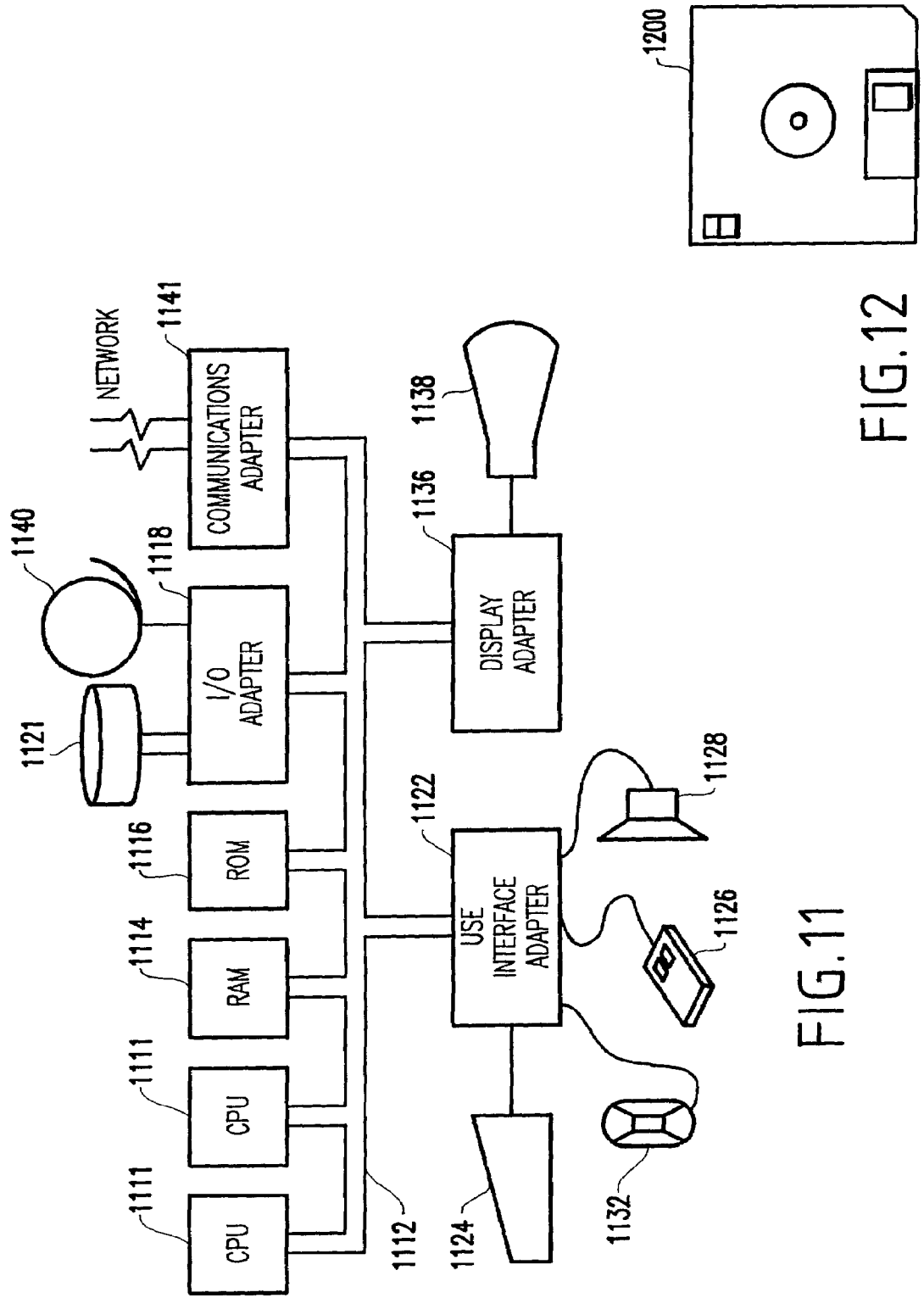

GRAPHICAL WEB BROWSING INTERFACE FOR SPATIAL DATA NAVIGATION AND METHOD OF NAVIGATING DATA BLOCKS

CROSS-REFERENCE TO RELATED APPLICATIONS

The present application is related to U.S. patent application Ser. No. 09/893,789, filed on Jun. 29, 2001, to Marcos Novaes, entitled "METHOD AND SYSTEM FOR SPATIAL INFORMATION RETRIEVAL FOR HYPERLINKED DOCUMENTS", to U.S. patent application Ser. No. 09/893,790 filed on Jun. 29, 2001, to Christopher Codella et al., entitled "METHOD AND SYSTEM FOR PREDICTIVE DIRECTIONAL DATA CACHING", and to U.S. patent application Ser. No. 09/893,599 filed on Jun. 29, 2001, to Marcos Novaes, entitled "METHOD AND SYSTEM FOR COLLABORATIVE WEB RESEARCH", each assigned to the present assignee, and incorporated herein by reference.

BACKGROUND OF THE INVENTION

1. Field of the Invention

The present invention generally relates to indexing of information and its retrieval, and it is particularly related to the information retrieval from networks such as the World Wide Web (WWW).

Prior to turning to the conventional techniques and systems for information retrieval, some basic principles in this field will be described hereinbelow.

First, a metadata relationship must be defined which will define the significance of the search space. The specific relationship utilized in the present invention is a text matching procedure similar to the matching procedure used in Web search engines today such as Yahoo!, Google, IBM's Clever, etc. Nevertheless, the method of the invention described hereinbelow is not restricted to this implementation, and the utilization of any other metadata relationship does not deviate from the spirit of this invention.

The metadata can be described as an additional block of information which is stored with the indexed data block, which contains information about the data which is contained in the block.

For example, a metadata block with the text "picture of sail boat" attached to a Joint Pictures Experts Group (JPEG) file (binary representation of a photograph) will be extremely helpful in retrieving the photograph when a user of the database posts a query like "retrieve pictures of a sail boat".

Without the metadata information, it would be more difficult to retrieve the picture. It would be necessary to construct a "picture template" which describes the basic features of a sailboat, and then employ sophisticated pattern matching techniques in order to recognize a sailboat from the binary representation.

Some metadata information can be contained in the stored data block itself, and not in an additional metadata block. For example, Web pages written in HTML (Hypertext Markup Language) contain tags (special text, defined by the HTML language) and text which are rich in metadata information.

For example, the text: "</TITLE Pictures of Sailboats/TITLE>" can be used to find a Web page which has "links" to pictures of sailboats. A link is a special tag in the HTML language which references another data block. Links are of special significance in the organization of the World Wide Web, and there are several techniques which study the patterns with which data blocks stored on the Web are linked to each other.

For example, a web searching technique utilized in search engines such as Google (e.g., see www.google.com) and IBM's Clever (e.g., see "Enhanced Hypertext Categorization using Hyperlinks", Proceedings of the ACM SIGMOD, Seattle, Wash., 1998) give special value to data blocks which are pointed to by several other data blocks. These "convergence" blocks are called "authorities".

Another important linkage pattern is defined when a single block contains several links to other blocks in which are related to "the same subject". A "subject", in the context of the present application, is a specific metadata relationship which relates data to a segment of text which describes the subject.

2. Description of the Related Art

Turning now to the conventional techniques, the definition of subject relationships is of primary importance in the construction of World-Wide Web ("Web") directories. However, prior to the present invention, there has been no efficient, reliable method for determining where a user may be interested in going and no efficient way to present the user with information without there existing a certain latency in presenting pages or documents.

For example, a well known search engine (e.g., the Yahoo! search engine) utilizes human specialists to sift through the Web maze to organize its directory. However, this search engine is problematic in that it is a manually-compiled Internet directory which uses human experts to read a document to determine a relationship and associations between the documents and then group them by interest. As known, Yahoo! also has a search engine facility in which a user can enter a word and a search is performed to find relevant documents (e.g., documents including the entered word). Yahoo! employs conventional techniques in which a matrix is built (e.g., a "term-by-document" matrix) including rows (e.g., terms starting with, for example, the letter "A" and so forth, similarly to words in a dictionary) and columns (e.g., indicating the percentage that the words occur in any given document).

Thus, for example, assuming a term(s) of interest is "IBM", a search would be conducted throughout a number of documents, and the number of occurrences (e.g., hits) found for "IBM" in each of a number of documents, would be reflected in the score for that document (e.g., if a document had 50 occurrences of "IBM", then it would have a relatively high score as compared to a document having only two (2) occurrences).

However, attempting to relate "IBM" to "computers" is more difficult. That is, Yahoo! does not provide a facility for determining such a relationship. Instead, a Boolean search (e.g., "IBM" and "computers" must be linked by the term "and") must be performed. This is cumbersome.

A second technique is found in the "Google" search engine. Google is a new approach which attempts to find links between items. Hence, Google does not merely scan a page looking for terms. Instead, the Google directory is built automatically by an autonomous process, called a "Web Crawler", which recognizes the specific metadata relationships described above. Thus, Google finds/counts the number of links coming in for a certain page and if Google sees a page which is pointed to by many other pages, then Google considers such a page as an "authority" on the subject of interest and ranks that page higher. For example, assuming a researcher publishes a very good paper on a topic and the paper is referenced/cited by many other authors in their papers, such a "very good" paper would be an "authority", and thus the papers would have to link to a page having the very good paper. Thus, Google would find all such pages having such a link to the very good paper, and would rank the page having the paper higher.

A third approach is IBM's Clever which utilizes both of the techniques above in Yahoo! and Google and in addition has the capability of detecting a "directory", which is a page that has several links to other pages and in which the degree of that page is very high. Hence, extending the example above, a compilation of all papers looking in a subject can be found and many links may be found to other references in that subject.

Thus, these conventional directories are utilized by users of the directory service in order to retrieve information which is related to a certain subject. Most of the directories today are utilized according to the following procedure which in the present application is referred to as a "traditional Web Navigation", as shown in FIG. 1 and described below.

The term "navigation" refers to the order in which the user retrieves a document. This procedure is important to the present invention, because it describes a method for information organization which makes possible a navigation pattern very distinct to the traditional Web Navigation, and much more powerful.

Turning to the conventional navigation technique, as shown in the method 100 of FIG. 1, in step 105, the user will provide the engine with a search string, which may contain text used in the metadata relationship and also logical operators (such as the logical AND operator in the case of a Boolean search).

In step 110, the search engine will then return a list of links to Web pages which are related to the search criteria. As noted above, this list may be ordered utilizing "search scores" obtained from some other criteria derived from the metadata, as explained above.

In step 115, the user can then browse this list, which typically contains the page titles and excerpts from the page where words contained in the search criteria were found. Then, in steps 120 or 125, the user will browse this list and select the link which may contain the desired information, or even lead to the desired information.

The term lead is here of special significance. For example, sometimes articles posted by news services, e-mail notes, and even chat records are returned as the result of a search. Now, the user may select to follow a link to one of such documents because of the possibility that the document in turn may contain a link to another document which has the right information (step 130).

Sometimes, the user may have to follow several of these links, until either the information is found (step 135) or the user comes to a "dead end" (e.g., steps 140, 145, 150, 155). A "dead end" in the Web navigation process occurs when the user follows a link to a document which is not relevant to his search and that contains no other links which are relevant to the search (steps 140–155).

When the user encounters such a dead end, the user has the choice of "backing up" (e.g., step 150 of going back) to the previous page, or to any of the other previously visited pages. The previously visited pages are collectively called "the search history". Then, the user can choose other links contained in pages in the search history to traverse. When no more interesting links are left in the search history, the user may go back to the original list of links returned by the search engine and select a new starting point for the traversal (e.g., step 115).

The user iterates on this process until either the information is found or the search list is exhausted. If the search list is exhausted, the user may resort to try another search criteria (e.g., step 120) which either describes the subject or is related to the subject that is being searched. The navigation process is then repeated. Hence, the conventional navigation technique of FIG. 1 is performed, but is inconvenient to the user due to backing up, etc.

That is, many times the user is searching for information which cannot be exactly defined by an exact search criteria, and as a result too many results are returned (in the range of thousands). In this case, the conventional navigation pattern described above will make it very hard to find the desired information, as shown in FIG. 2.

That is, FIG. 2 illustrates the traditional navigation pattern resulting from the conventional web navigation in which finding the most relevant document is somewhat cumbersome and difficult.

As shown in FIG. 2, on the search result page, the searched results are ordered according to their search score, with the highest being shown on the left hand side and sliding to the lowest across the page to the right hand side. L1–L12 are links and D1–D10 are documents. As shown, finding the most relevant document D10 is time consuming.

As evident from FIG. 2, a user always must traverse links to search pages. That is, a common problem is that after a search is input and the results are returned, the user goes through each page (document) one-by-one. However, if the user loses the list by, for example, traversing through a plurality of pages by following links on each page, then the user must back up and must return to a top page (link). Thus, for example, after traversing D6, the user must return to the top (the search results page) and then go to link L2. It is noted that going through the documents under link L2, document D5 will be accessed twice by traversing the links under link L1 or under link L2. The operator then returns to the top and accesses link L3 and so forth, until document D10 is finally found. Thus, the conventional web navigation pattern is slow and time-consuming.

Thus, prior to the invention, there has been no satisfactory method in which to find and navigate data in Web pages, databases, etc.

SUMMARY OF THE INVENTION

In view of the foregoing and other problems, drawbacks, and disadvantages of the conventional methods and structures, an object of the present invention is to provide a method and structure having a new Web and general database navigation pattern.

Another object is to provide a method for navigating the Web which does not require traversal of HTML links.

Yet another object is to provide a method (and system) in which data blocks are organized according to a spatial function derived from the metadata (and hyperlink information) which is contained within each block.

A still further object is to provide a graphical facility for enabling the new spatial navigation.

Yet another object is to provide a graphical facility which can guide a human researcher into the navigation and retrieval of documents in the World Wide Web.

Another object is to provide a method (and apparatus) for predictively caching data that can be used to reduce the latency with which documents can be retrieved from remote network systems, such as the World Wide Web.

A further object is to provide a method and apparatus which can be utilized by a plurality of human researchers that engage in collaborative research.

A still further object is to provide a portal which can correlate the usage habits of each human researcher and can notify a researcher of a given topic that other researchers are currently working in related topics.

In a first aspect of the present invention, a graphical facility is provided which is capable of guiding a human researcher into the navigation and retrieval of documents in the World Wide Web.

More specifically, the graphical facility (and method) according to the present invention includes a display window, and a retrieval object displayed on the display window for assisting a user in retrieving data which is spatially organized in N-dimensions and displaying the data on the window.

The facility is capable of correlating the human researcher's actions with the responses from previous users in the system, and is therefore capable of learning behavior (e.g., adaptive to the user) and of guiding the researcher to the appropriate information, as described below.

In a second aspect of the present invention, a method of navigating data blocks, includes opening a first data block of a plurality of data blocks of interest, the plurality of data blocks being spatially indexed in N dimensions, viewing a closeness relationship between the first data block opened and a second plurality of data blocks based on their content, and accessing a second data block of the second plurality of data blocks which is viewed to be closest to the first data block.

With the invention, a graphical facility is provided which can guide a human researcher into the navigation and retrieval of documents in the World Wide Web.

BRIEF DESCRIPTION OF THE DRAWINGS

The foregoing and other purposes, aspects and advantages will be better understood from the following detailed description of preferred embodiments of the invention with reference to the drawings, in which:

FIG. 11 illustrates an exemplary hardware/information handling system 1100 for incorporating the present invention therein; and FIG. 12 illustrates a signal bearing medium 1200 (e.g., storage medium) for storing steps of a program of a method according to the present invention.

DETAILED DESCRIPTION OF PREFERRED EMBODIMENTS OF THE INVENTION

Figure 1:
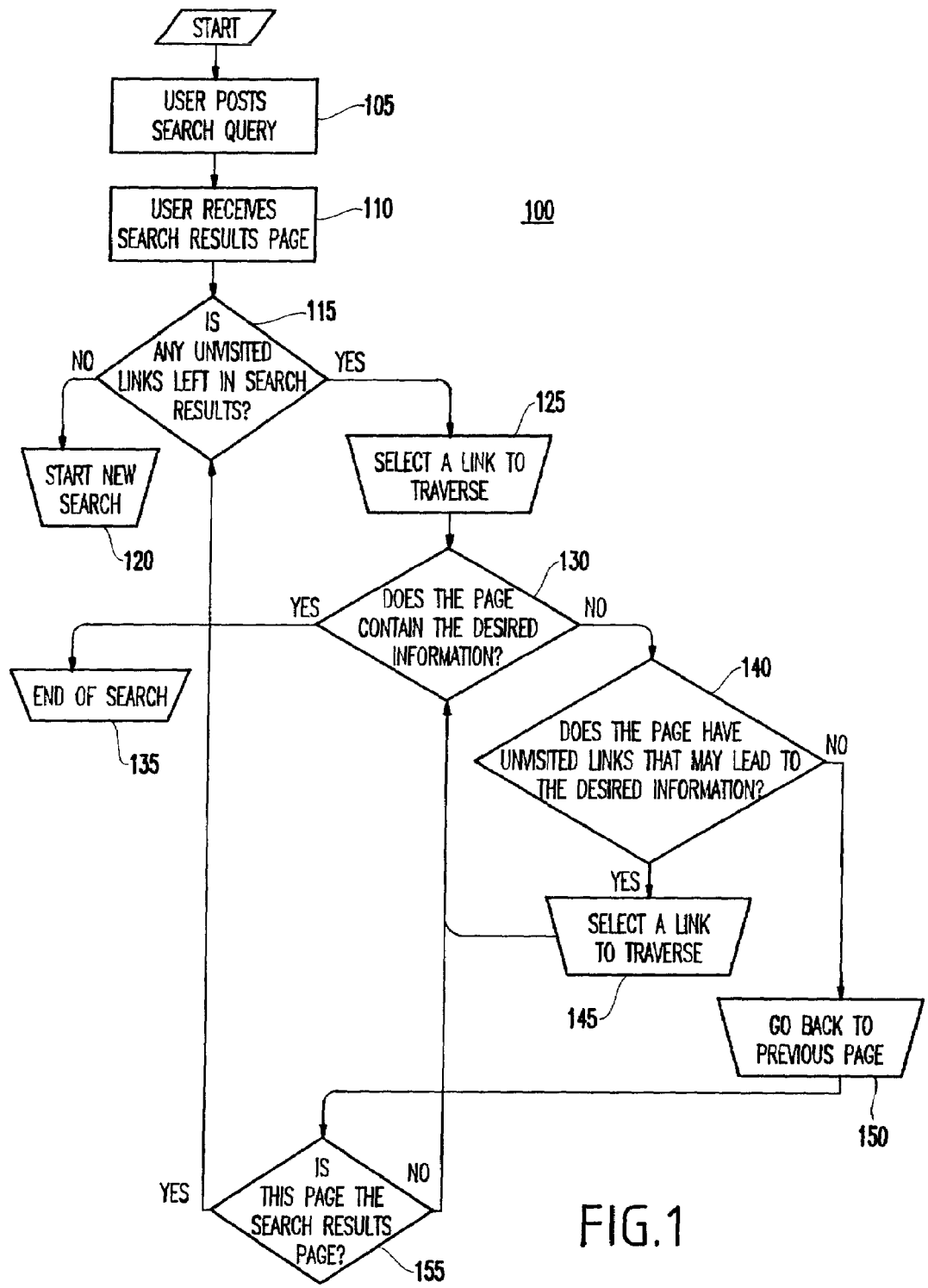
FIG. 1 illustrates a flowchart of a conventional web navigation process 100.
Figure 2:
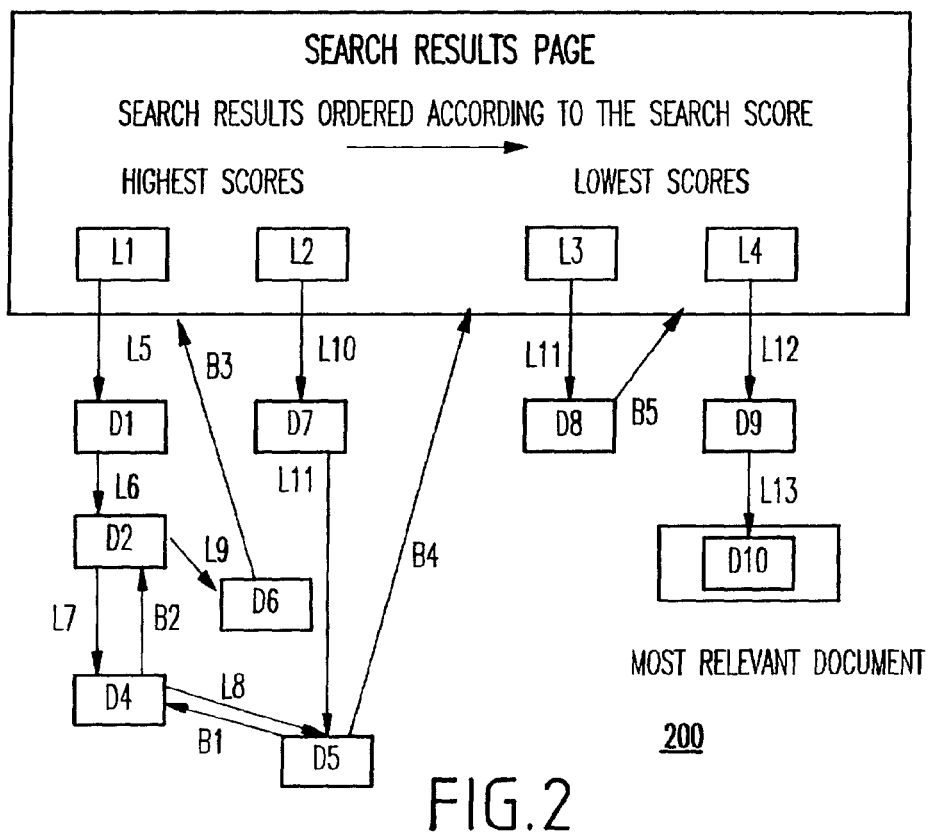
FIG. 2 illustrates a conventional web navigation pattern 200.

Referring now to the drawings, and more particularly to FIGS. 1–12, there are shown preferred embodiments of the method and structures according to the present invention.

Prior to discussing the first embodiment in detail and for purposes of clearly showing the revolutionary nature of the invention over conventional techniques, it is again noted that typically, web users start the Navigation process utilizing a search engine as described above and as shown in FIGS. 1 and 2.

First Preferred Embodiment

Figure 3:
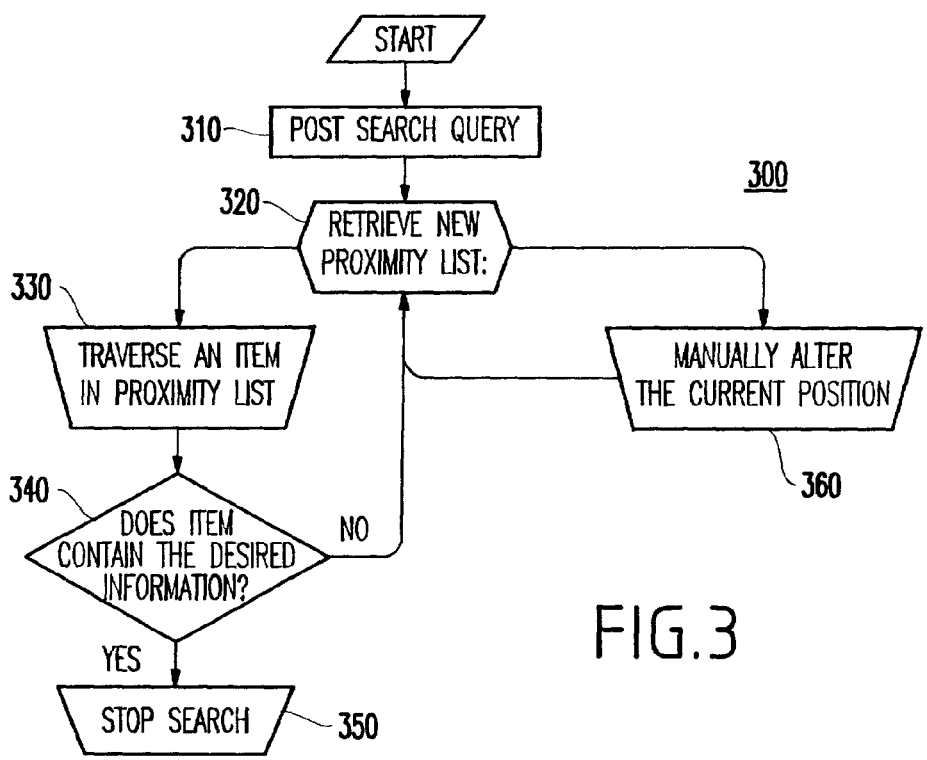
FIG. 3 illustrates a flowchart of a spatial navigation process 300 according to the present invention.

Turning now to FIG. 3, hereinbelow, a spatial web navigation process 300 according to the present invention solves the above and other problems.

In contrast with the conventional navigation technique described above, the spatial navigation technique utilized in the present invention does not rely exclusively in the traversal of links in order to retrieve documents from the World Wide Web. That is, the inventive distance function allows the invention to move from one page to another without traversing a link (e.g., without opening up a document by clicking with a browser or the like).

In the spatial navigation model of the invention, the data blocks (Web pages, pictures and so forth) are indexed such that each data block resides in a specific point in a N-dimensional coordinate system. The placement of the data blocks in this coordinate system is performed such that data blocks which are relatively "close" to each other are related to the same subjects.

The "closeness" between any two data blocks is given by the Euclidean distance of two points in a N-dimensional space:

$$D(P1, P2) = \sqrt{S_D(P1_D - P2_D)^2}$$

The specific metadata method used to place the data blocks in the N-dimensional space ensures that the distance relationship between any two points indeed reflects the "affinity" of the data stored at the specific coordinates.

A data block is said to have "affinity" to another data block if both data blocks have high search score results for at least one subject. The mapping space has N dimensions, where N is the number of subjects. The distance relationship is the sum of the distances according to all subjects, and will therefore provide a meaningful measure of the affinity of any two data blocks.

Again, the mapping relationship utilized to place the data blocks in the N-dimensional coordinate system is a key aspect of the present invention, and is described below.

The mapping of the data blocks into N-dimensional state enables a unique different type of Web navigation based on space coordinates. This new web navigation model is described now.

Turning to the flowchart of FIG. 3 illustrating the inventive method 300, in step 310, the user specifies a point in the N-dimensional space by providing the search criteria of interest. This search criteria is defined as a weighted list of subjects of interest, such that the sum of the weights is normalized to reach 100.

That is, the user provides a list of subjects and a measure of weight of each subject according to the user's intuition of how relevant that subject is to the search. For example, a user wanting information on "Patents, Filed, IBM", could supply the following search criteria: "{(Patents, 40), (Filed, 20), (IBM,40)}". Such criteria would give more weight for pages related to "Patents" and "IBM", while reducing the weight of the term "filed", which is just used to refine the search, thereby to avoid retrieving material about patents that were "issued" as opposed to just "filed". This expression is translated to a point in the N-dimensional coordinate system.

Because the mapping procedure also normalizes weights to 100, the point generated will have the value 40 for the "Patents" coordinate, 40 for the "IBM" coordinate, 20 for the "filed" coordinate and 0 in all other coordinates. This point is named the "current location" in the search space (e.g., insertion point), which is the point that marks the position of the search relative to the N-dimensional space.

The spatial search engine can now produce a list (e.g., a so-called "proximity list") of links to documents which are related to the search by finding the points which are the closest, according to the distance formula above, to the point of insertion (step 320). Preferably, the proximity list is ordered in ascending order of proximity, with the closest point being listed first.

At step 320, the user now has several navigation choices.

First, the user may choose to visit one of the documents by following a link in the proximity list (e.g., step 330).

Alternatively, the user may choose to reorder the "proximity list" by changing the coordinate of the current location directly (e.g., step 360). For example, the user may notice that the proximity list includes too many documents which are related to "Patents", but not many related to "IBM". Thus, the user may decide to manually change the current location to {(Patents,30),(Filed,20), (IBM,50)}.

If the user decides to visit a document (e.g., step 330) in the proximity list, then the current position is changed to the position of the visited document, and the proximity list is changed accordingly. Thus, the user can now consult the page and a proximity list which shows other documents which are more closely related to the currently visited page. Then, the user has several methods of document traversal at his disposal.

First, the user may follow a link from a page, as was done in the traditional navigation scheme described above and shown in FIG. 1.

Secondly, the user may follow an item in the proximity list, which allows the user to navigate independently of links found in other documents.

Thirdly, the user may manually alter the current position in order to change the proximity list.

Thus, depending upon where the insertion point is, a virtual space is created having reduced dimensions, such that the user obtains more resolution in the direction moved toward the desired document. That is, the resolution increases as the user moves in the direction of the document that the user is looking for.

Figure 4:
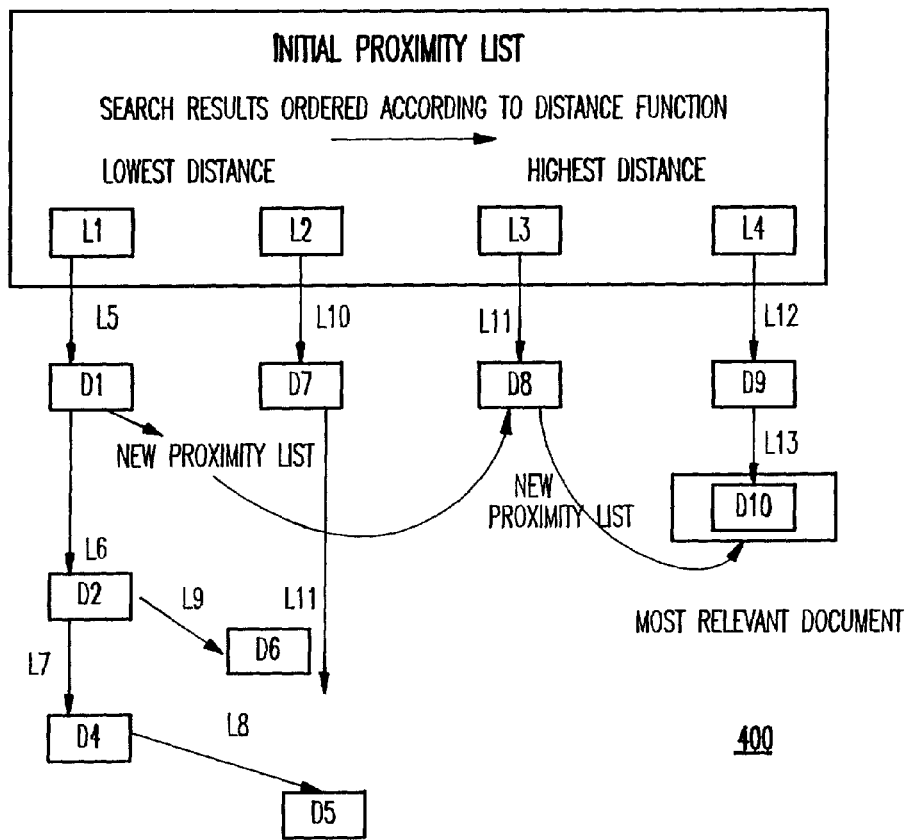
FIG. 4 illustrates a spatial web navigation pattern 400 according to the present invention.

FIG. 4 illustrates a sample Web traversal pattern which results from spatial navigation. It is noted that, as compared with the conventional pattern of FIG. 2, the invention allows the user to avoid many unnecessary traversals to reach the desired document.

As shown in FIG. 4, the search results are ordered according to the distance function. Thus, selecting a link L1 leads to document D1. Upon getting to document D1, a new proximity list is generated which shows documents which are closest to D1, and the document can be traversed or other documents in the updated proximity list can be traversed.

That is, getting to D1 allows one to traverse to document D8 (e.g., because D8 is on D1's proximity list), even though there is no hypertext link from D1 to D8. Further, because D8 is "close" to D10 (e.g., D10 is on the proximity list of D8), it is possible to go from D8 to D10 without traversing a link. Hence, in three steps ("clicks" or operations), one can go from the search results page to the most relevant document D10 (without necessarily traversing a link).

While the invention works with hypertext links (and thus the Web), it is noted that the invention also works in database systems without hypertext links since the invention uses content to plot documents in space. Thus, for example, the invention would be beneficial for a large database of books, since the invention could search for content even though the books may be different and could navigate any collection of information (e.g., in the case of the book database, to find two books which are the most related). Hence, documents are being plotted in space based on their content.

As evident from the above, the invention allows plotting documents in space based on their content which allows a user to quickly go to the documents and see their relationship (their affineness or "closeness") based on the calculation of the distance function, without traversing each link, without clicking on each link and without getting deeper and deeper into a search (e.g., a vertical search in which the user is forced to go to the top of the search time after time). Instead, based on the proximity list, the user is able to traverse documents horizontally as opposed to only vertically, to find the document(s) most relevant to the information sought.

Figure 5:
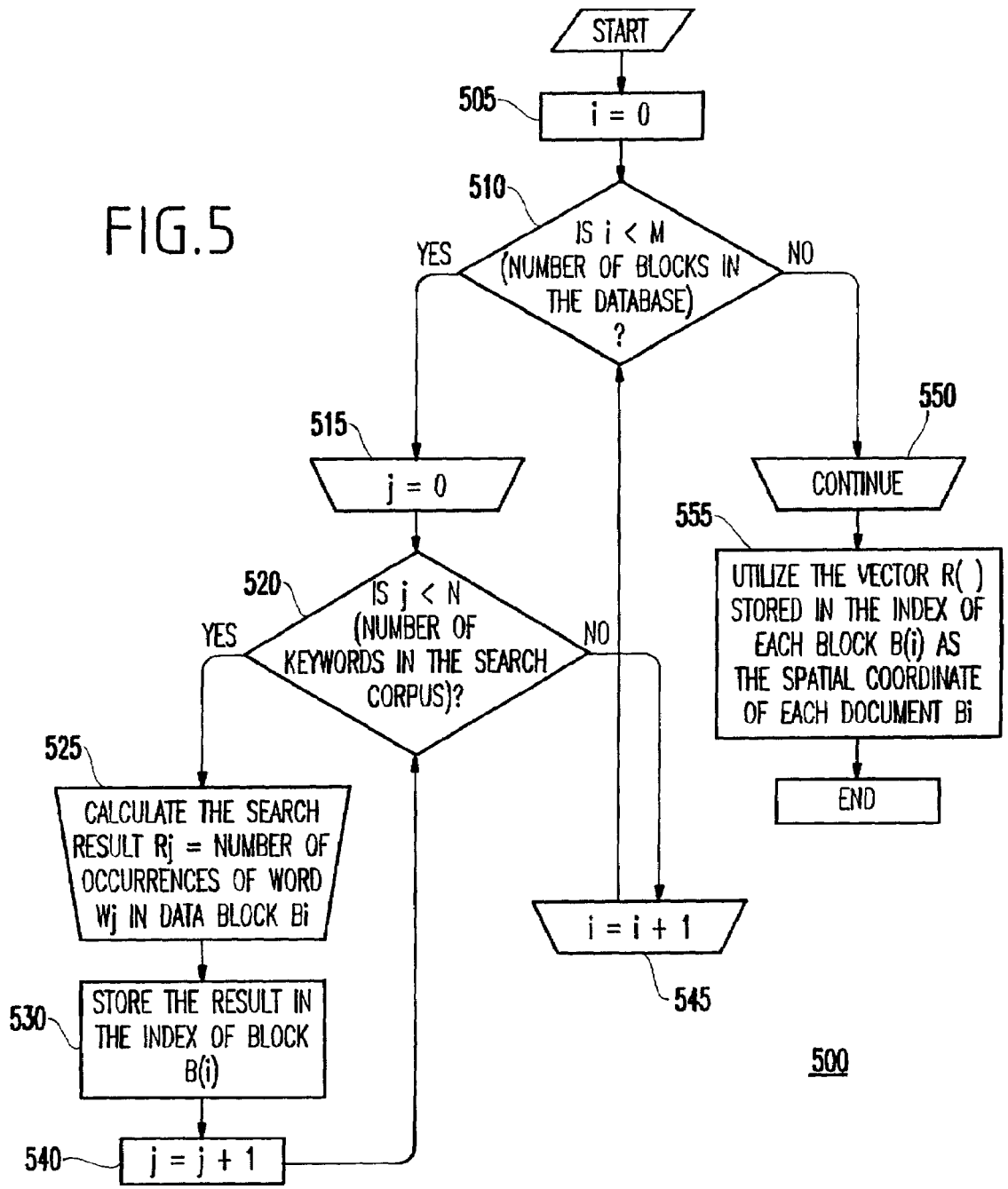
FIG. 5 illustrates a flowchart of a method 500 for mapping data block into N space according to the present invention.

FIG. 5 illustrates a flowchart of a method 500 for mapping data block into N space. That is, as is believed clear to one of ordinary skill in the art taking the present application as a whole, the document navigation system of the present invention is most efficient if the data blocks are indeed positioned in the N-dimensional space according to their relevance.

FIG. 5 illustrates a process for multi-dimensional data mapping which achieves such an objective.

The method 500 utilizes N dimensions, where N is the number of words (keywords) or subjects in a selected corpus. The method 500 has a computational complexity which grows linearly with the magnitude of N, and therefore method 500 can be used even if N is very large. The method 500 involves the traversal of document links, which leads to the discovery of cross-subject affinities.

In method 500, the inputs may include a collection of data blocks which are to be indexed. These data blocks may contain data and metadata, as well as links to other data blocks. Further input is a search depth which is a parameter which defines how many links are to be followed during the search process. Additionally, a corpus (collection) of text strings labeled 1 to N is input. These text strings are used as search criteria in the spatial indexing process.

The outputs of the method 500 are a collection of index blocks which maps each of the data blocks given as an input to a N-dimensional space.

The data structures include a unique data block identifier which is created for each data block. In this particular implementation, which is targeted at WWW applications, the unique identifier of a data block is the URL (Unique Resource Locator) of the data block. Other applications may use different unique identifiers.

Another data structure is the index record. That is, for each data block given as input, an index record is created which will be used to store the search results which relate the data block to each of the strings in the corpus.

A third data structure is a global index record array, which is a data structure which contains the index records for each of the data blocks given as input.

Now, turning to the flowchart of FIG. 5, the method 500 will be described. First, in step 505, an index record in the global index array i is set to 0.

In step 510, it is determined whether the index record i is less than M (e.g., the number of blocks in the database). If "YES", then the process proceeds to step 515, at which j is set to 0.

In step 520, it is determined whether j is less than N (e.g., the number of keywords in the search corpus). If "YES", then the process continues to step 525.

In step 525, the search result Rj is calculated as the number of occurrences of word Wj in the data block B(i). The search result Rj is stored in the index of block B(i), in step 530. Then, in step 540, j is incremented by "1" and the process loops back to step 520.

If a "NO" occurs in step 520, then the process proceeds to step 545 at which index record i is incremented by "1" and then the process loops to step 510.

If "NO" in step 510, then the process loops to step 550 and step 555. In step 555, the vector R( ) is stored in the index of each block B(i) as the spatial coordinate of each document Bi. Then, the process ends.

Figure 6:
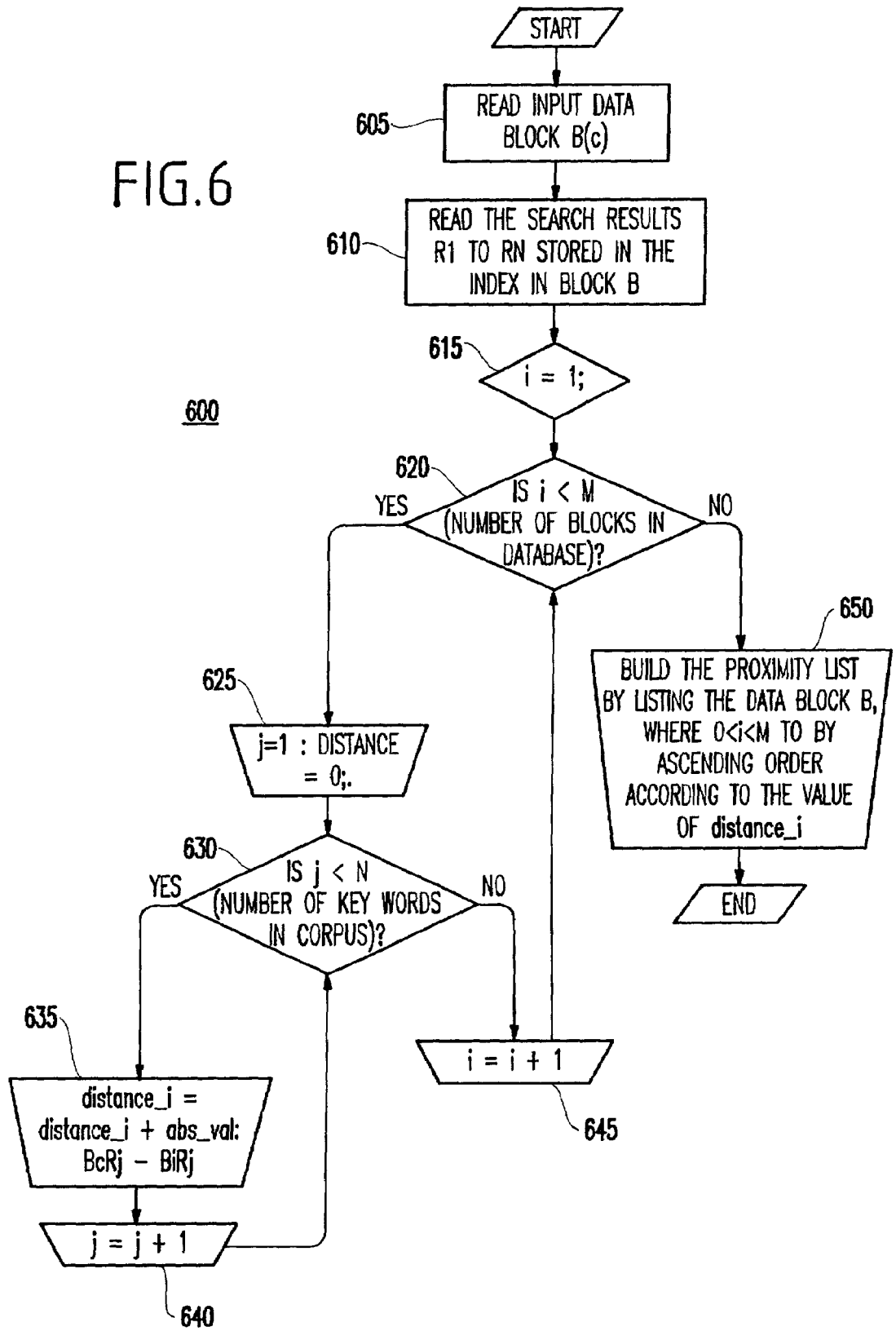
FIG. 6 illustrates a flowchart of a method 600 for calculating a proximity list for a data block according to the present invention.

FIG. 6 illustrates a flowchart of a method 600 for calculating a proximity list for a data block.

First, in step 605, input data block B(c) is read. Then, in step 610, the search results R1 to Rn stored in the index in block B are read.

In step 615, i is set to "1", and in step 620, it is determined whether is less than M (e.g., the number of blocks in the database).

If "YES", then the process continues to step 625 where j is set to 1 and the distance is set to 0.

In step 630, it is determined whether j is less than N (e.g., the number of key words in the corpus). If "YES", then the process continues to step 635 where the distance is incremented to a sum of the previous distance and the absolute value of BcRj–BiBj. That is, the absolute value is found of the difference between result Rj of block Bc and result Rj of block Bj. Then, in step 640, j is incremented by "1" and the process loops to step 630.

If, in step 630, it is determined that J is not less than N (e.g,. a "NO"), then i is incremented by "1" in step 645 and the process loops to step 620.

If, in step 620, it is determined that i is not less than M, (e.g., a "NO") then the process continues to step 650.

In step 650, the proximity list is built by listing the data blocks B(i) wherein 0<i<M by ascending order according to the value of distance (i). Thus, the process terminates and the proximity list has been calculated for a data block.

It is noted that the above-described pattern 400 of spatial information retrieval, as shown in FIG. 4, may make present day user interfaces inappropriate for the task of Web Navigation.

To assist the user in the spatial navigation process, it is desirable to provide the user the ability to position the search focus and to direct the coordinates of the search in a way that is meaningful, according to the spatial navigation pattern described above.

Figure 7:
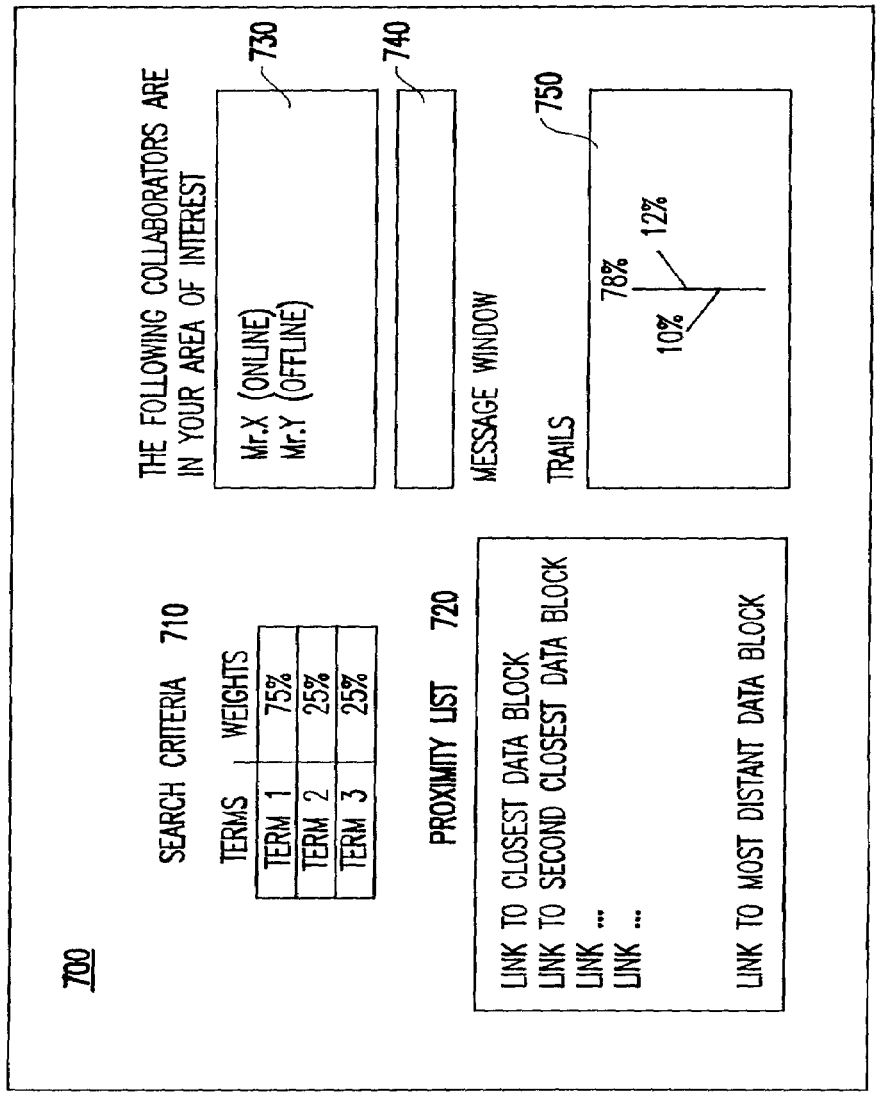
FIG. 7 illustrates a web navigation interface 700 according to the present invention.
Figure 8:
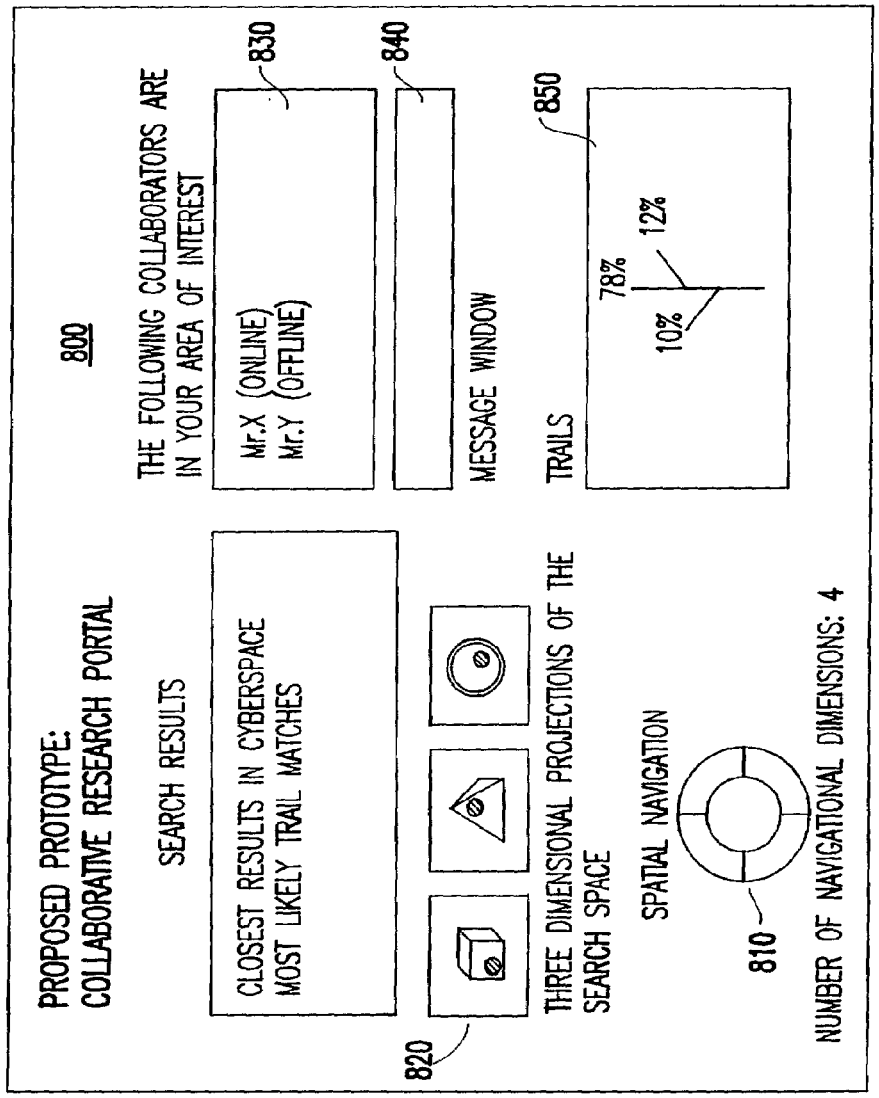
FIG. 8 illustrates another web navigation interface 800 according to the present invention.

That is, the spatial navigation can be aided by graphical user interfaces which show the projection of the N-dimensional space into two-, three-, or more dimensions (as shown in FIGS. 7–8 and described below).

In the current example, a projection in three dimensions would be shown, obtained by first selecting all data blocks in the space which have a non-zero value for the coordinates (Patents, Filed, IBM), and then by making the value of all other coordinates equal to zero.

The results can then be displayed in a scatter-plot, which will reveal a geometric solid with dense and sparse areas. This solid is oriented in the three axis, and therefore the points which are at the center are related of all three subjects. A point with a high value in the "Patent" axis, and low values in the other two will contain data blocks which are relevant only to the term "Patent", but not to "IBM" or the term "Filed".

The most significant pages will be in the most densely populated area that is not skewed towards any particular axis. The current position of the search is also shown in the scatter-plot, and now the user can navigate in the scatter plot using either a mouse, a joy stick, or other input device. As the user navigates the three dimensional scatter plot, the current position changes and so does the proximity list.

In this spatial search, the user may be aided by tools derived from geometry. For instance, the user may request the current position to be placed in "the center of the most densely populated area". This navigational pattern gives a whole new degree of freedom to Web navigation, which is much superior than the traditional link following. Actually, it is unnecessary for the documents to contain any inter-document links, which makes this procedure applicable outside of the scope of web navigation.

Second Embodiment

FIG. 7 illustrates a graphical user interface 700 according to the present invention, which provides the human user the ability of controlling the parameters of the search procedure described herein.

The spatial navigation interface 700 includes "Search criteria" 710, a proximity list 720, as well as a window 730 indicating human researchers who are in the area of interest and whether they can be contacted on-line or off-line and their contacts numbers/addresses, a message window 740, and "Trails" 750.

The window 710 allows the user to enter weights for a number of search terms. The weights are used as spatial values with the axis corresponding to each search term, and the list of weighted terms is then translated to a point in the N-dimensional space. This point defines the position where the user is first placed within the search space, and will determine the first proximity list sent to the user. After being placed in this original point of search, the user can move in the direction of any of the search terms by modifying the weight of the term.

When the user retrieves a data block, the "Trails" window 750 will display the next document most likely to be received based on the usage of previous users of the system.

FIG. 8 illustrates another spatial navigation interface 800, similar to that of FIG. 7, but specifically for graphical WWW browsing interface for the spatial data navigation method described herein.

That is, as shown especially in the left-hand side of FIG. 8, graphical facility 800 is provided which is capable of guiding a human researcher into the navigation and retrieval of documents in the World Wide Web (WWW). Facility 800 includes some interface blocks similar to those of FIG. 7, but also includes a spatial navigation tool 810 indicating a number of navigational dimensions, as well as a three-dimensional projection 820 of the search space to allow a human user to visualize where in the search space the user currently resides and the direction the user is going.

The facility 800 allows for correlating the human researcher's actions with the responses from previous users in the system, and is therefore capable of learning behavior (e.g., adaptive to the user) and of guiding the researcher to the appropriate information.

That is, the researcher is guided to the appropriate material utilizing the "Trails Index". Each time that a researcher retrieves a sequence of documents (i.e., D1 and then D2), this action creates a record (D1D2=1) in the Trail Index of the first document. As other researchers repeat this sequence of retrievals (D1 and then D2), the record D1D2 is incremented. The Trails Index window allows a user which has retrieved document D1 to see the action taken by previous users which have retrieved the same document. Thus, the Trails Index is capable of "learning" the preference of users in retrieving the next document, given that a certain document has been retrieved.

The portal also provides another aid to the researcher. That is, as the researcher retrieves documents, the spatial coordinates of the documents retrieved form the boundaries of an "area of interest" for the given researcher. The area which is bounded by these points is then compared with the area of interest of other researchers, and whenever the areas of interest of two researchers intersect, both researchers are notified. The percentage of the intersection area is included in the notification, so that a researcher can evaluate how closely related his research is to that of another researcher with an intersecting area of interest.

It is noted that, in the example above, finding the proximity (e.g., "closeness") of the documents to one another is performed by finding the distance between documents. While an exemplary algorithm is provided above for finding the distance, many other distance measurement algorithms may be used besides finding a vector distance between certain points in space. Other distance functions and spatial mappings are possible, including optimization algorithms.

Indeed, for example, a dictionary may have 30,000 entries which may present difficult computation issues in finding all of the permutations of the distance vectors closest to the item of interest. Hence, to reduce the number of dimensions, possibly 1,000 entries, which are specifically related to a certain field of interest, may be selected to reduce the space and reduce the computation. Moreover, smart algorithms can be used Thus, the present invention should not be construed as requiring the above specific distance measurement algorithm and implementation.

Third Embodiment

Figure 9:
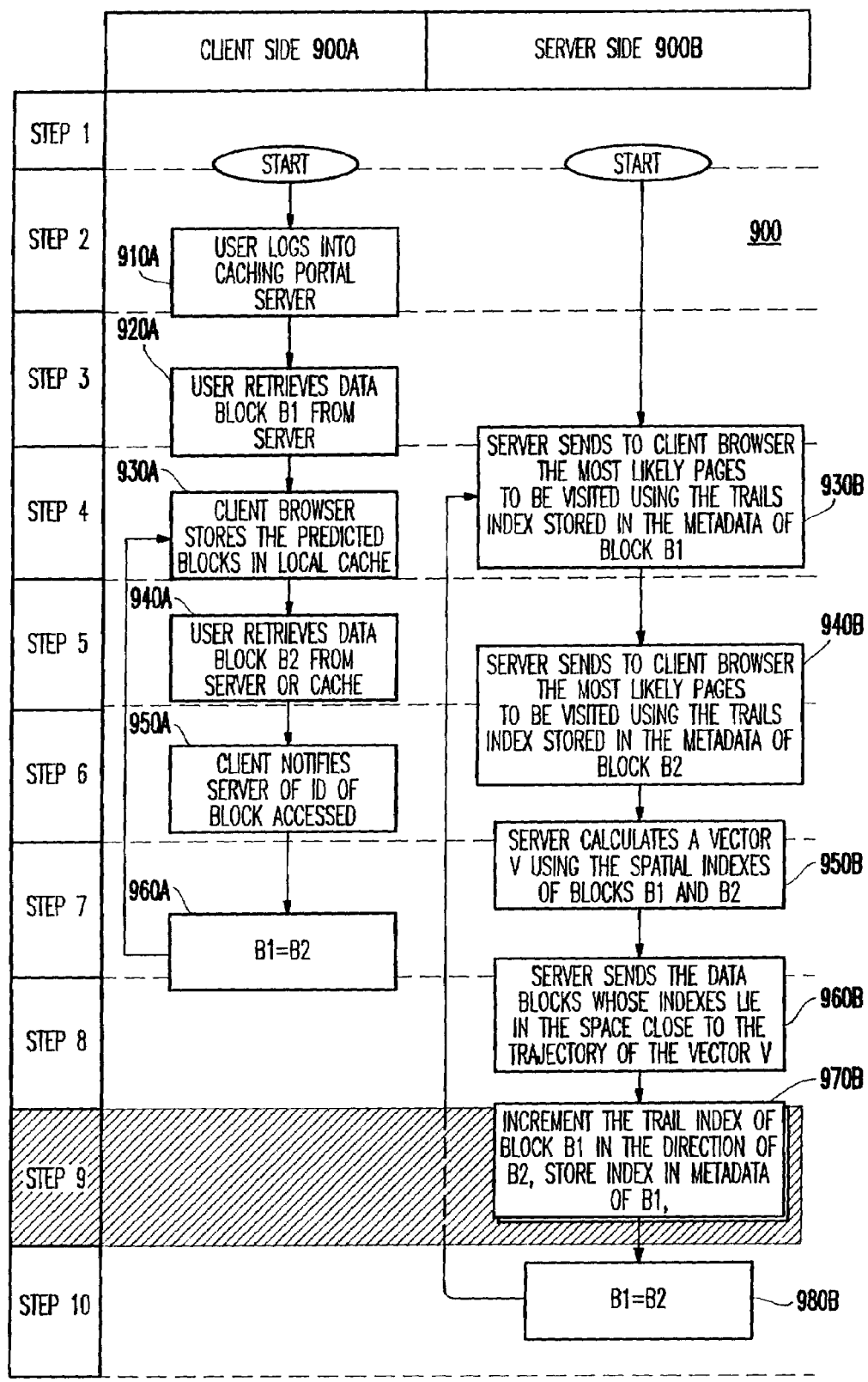
FIG. 9 illustrates a flowchart for a method 900 of predictive Web caching according to the present invention including the operations being performed on a client side 900A and a server side 900B.

Referring now to FIG. 9 (as well as to FIGS. 7 and 8 illustrating graphical user interface facilities) in a third embodiment, a predictive Web caching portal is provided which is an application of the N-dimensional indexing scheme described above, and which is capable of predicting which document is most likely to be retrieved by a specific user.

The Web caching portal of the invention uses this capability to automatically download the most likely documents to the client browser before they are requested by the user, thereby greatly reducing the response time experienced by the user for retrieving documents.

The predictive Web portal according to the present invention utilizes the N-dimensional space indexing technique described above to construct an indexed database of documents which are to be retrieved by the human researcher. The predictive web cache is based on a distance function which is partly derived from the Euclidean distance of documents in the N-dimensional space described above and from the usage pattern of other users of the Web portal.

A key benefit of the predictive Web caching procedure is that it allows an estimate to be made of the next point in the N-dimensional space that a user is most likely to traverse, given the "current search position". To estimate the "next point of traversal", the web caching technique attempts to compute a direction of trajectory given the user's recent traversals (e.g., document retrieval pattern), and also considering the recent traversals of other users of the caching portal.

The document traversal pattern of a given user is called a "traversal trail", or simply "trail", in the scope of this application and is illustrated in the Graphical User Interface Facility of FIG. 7 as "Trails" 750 as described above.

Hereinbelow, trails 750 and their utilization in predictive Web caching will be described with reference to FIG. 9.

The predictive Web caching portal of the invention is advantageously utilized by users of the WWW to retrieve documents with a minimum response time. The inventive portal retains the memory (e.g., a record) of the sequence in which documents are traversed by any given user.

When a user retrieves two documents in sequence, the first document is considered the "origin" of a movement and the second document is considered the "destination". The portal will add an entry, named "trail count record", in the search record index of the origin document labeled with the Unique Resource Identifier (in this case the URL) of the destination document, or increment the trail count record, if one already exists.

Two documents are considered to be retrieved "in sequence" if the user retrieves them within the scope of a single search operation. The point of origin of a trail is the point of insertion of the search (e.g., the point that is defined by the search criteria initially posted by the user in a search operation).

A metadata index block is created corresponding to the point of insertion, which becomes the point of origin of the traversal. Then, the search results are sent to the user, and also the documents for which the index position are the closest to the point of origin.

Then, the user will select one of the documents from the search result, and, as a result, a "trail count record" is created at the point of origin labeled with the URL of the document selected, or an existing one is incremented. The point of origin now becomes the position index of the recently retrieved document.

When the user initiates the retrieval of a document, the Web caching portal will consult the index record. Then, it will compute which points are the closest to the origin, using Euclidean distances, and also compute which documents are the most likely to be traversed next based on the previous usage of other users. This is done by consulting the trail records of the index.

The predictive Web caching portal of the invention will then return:

1) The document which the user requested;

2) The documents for which the positioning index is the closest to the requested document; and 3) The documents for which the trail count record of the requested document indicates that are the most likely to be retrieved next.

It is noted that the trail count record of a given document is not restricted to the linkage pattern of the World Wide Web, in this particular implementation. This is because the inventive predictive Web portal also enables spatial document navigation. Therefore, the following scenario is possible.

That is, a user retrieves a document A. As a result a new "proximity list" is returned to the user, indicating which documents are the closest to A. (The closest documents are also returned and cached at the client for further retrieval).

The user now selects another document, B, from the proximity list, even though there was no HTML link from document A to document B. This is possible because of the N-dimensional indexing described above. The proximity list in this case provides another kind of "linkage" between documents. That is, the proximity list provides a non-HTML linkage between documents.

As a result of this selection, a trail count record is made in the index of document A, recording the fact that "one user retrieved B in sequence to A". This trail count record will be incremented any time that other users make the same retrieval sequence.

Now, assuming that another user retrieves document A, the predictive Web portal of the present invention is able to estimate that the user is potentially interested in document B (although, again, there is no HTML link from A to B), and therefore it can send document B also to the client, for future retrieval.

Hence, the trails mechanism 750 is independent from HTML links, and this feature clearly distinguishes this technique from any other traditional Web caching technique.

Additionally, in another aspect and turning to Web usage tags for client side caching (trail index), it is also possible to deploy a client side implementation of the predictive Web caching portal, as shown on the client side 900A of FIG. 9.

The client side implementation allows the Web Browser software itself to make the determination of which documents are likely to be retrieved next by a user. It is noted that this limitation has a reduced capability, because it relies entirely in HTML links. It also relies on the adoption of a special HTML tag for links which contain a counter of the number of times that a user has traversed that link. Each time that a user traverses a link, the counter is incremented. Hence, the Web document is actually modified, to reflect the value of the link tag. This implementation is much less powerful than the predictive Web caching portal, but it may be valuable in the context of "peer-to-peer" computing.

Turning now to the specific operations shown in FIG. 9, first, as shown on the client side 900A, a user logs into a caching port server (step 910A) and the user retrieves data block B1 from the server (step 920A).

Then, on the server side 900B, the server sends to the client browser the mostly like pages to be visited using the Trails index stored in the metadata of block B1 (step 930B). The client browser on the client side 900A then stores the predicted blocks in its local cache (step 930A).

Then, a user retrieves data block B2 from the server or from its cache (step 940A), and the server sends to the client browser the most likely pages to be visited using the Trails index stored in the metadata of block B2 (step 940B).

Thereafter, the client notifies the server of the ID of the block being accessed (step 950A) and the server calculates a vector V using the spatial indexes of the blocks B1 and B2 (step 950B).

Then, on the client side, block B1 is set to B2 (step 960A), and loops back to step 930A at which the client browser stores the predicted block(s) in the local cache.

Meanwhile, the servers sends to the client the data blocks whose indexes lie with the space close to the trajectory of the vector V (step 960B), and increments the trail index of block B1 in the direction of block B2, and stores the index in the metadata of block B1.

Thereafter, B1 is set equal to B2 (step 980B) and the process loops back to step 930B.

Hence, the invention uses techniques in the server to determine the content which the user would most likely fetch next, given that the user has already fetched one document from that portal. As described above, the two techniques that are used to determine which is the most likely content (document) that the user will want to access next, include the "trails" map 750 and links (e.g., listed in the proximity list 720) which the user may click on given that he is viewing a certain page. These windows (e.g., trails 750 and the links) are preferably opened/displayed in conjunction with the page the user is currently viewing.

As described above, on the server side 900B of the "Trails" technique, the server keeps a count/record attached to the file of how many times any given user has retrieved a page given that the user has retrieved a first page. Hence, after a user X has opened a first page using the caching portal, and then opens a second page, the server keeps a history of such a sequence of opening pages, and the server increments a count each time such a sequence is followed by the user. Hence, given the user's earlier access, the most likely materials of interest can be retrieved next. This information is used to calculate the probability that the user will access a second page after a first page has been opened.

To provide a concrete example of the above method and as an exemplary implementation of the this aspect of the invention, consider a researcher who is interested in the Space Shuttle.

That is, assume that there exists a page having an article (text) on the Space Shuttle Project and on that page there is a link to a picture (image) of the launching of the Space Shuttle, and it has been discovered that almost all users (e.g., 99%) have accessed the picture (clicked on the link) of the launch after having first opened the first page (e.g., the article).

By knowing this information (e.g., that the probability is extremely high that the launch image will be opened by users having first accessed the text article), the server can cache the picture of the Shuttle launch in advance and in anticipation of the user wanting to view this image, based on the user having first opened the page having the article on the Space Shuttle.

That is, the server caches the launch image while the user is reading the article on the Space Shuttle, thereby reducing any client side latency and instantly displaying the launch image as soon as the user clicks on the launch image. Such an image can be stored in the buffer memory of the client side. Thus, there is substantially no wait (e.g., no latency) on the client side.

For basis of comparison, it is known that a conventional browser has a cache and that the browser keeps a history of the previous 10–15 accesses. However, the invention differs from this simple caching by the browser in that the invention predicts, based on a user's opening of a first page, which page(s) will most likely be opened next by the user.

Further, it is noted that the history of usage is based on a history of all users of the system and not necessarily the specific user currently accessing the page(s). Hence, these user(s) are connected to the inventive portal so that the tracking (and storage) of the users' accessing behaviors can be accomplished. Thus, the invention can predict what the user wants to view next based on prior users' access usage behavior.

With this aspect of the invention, the predictive caching of data can reduce the latency with which documents can be retrieved from remote systems, such as the World Wide Web. The inventive method estimates which documents or data blocks are most likely to be visited by a certain human researcher, given that a number of documents and data blocks have already been retrieved by the user, in a given order.

Further, this aspect of the invention employs the knowledge of the order with which previous documents have been retrieved, and is capable of making a spatial interpolation which indicates which documents are most likely to be retrieved next.

Hence, with the invention, the data caching apparatus continuously sends to the client machine the documents which are most likely to be accessed next, thereby to reduce latency times.

Further, it is noted that a user's movements can be tracked based on the indexing discussed above. For example, assume that a user is interested in (e.g., researching) patents filed by IBM and that the user is determined/observed to be concentrating on a certain axis (e.g., the IBM axis) of the special coordinate system. Now, if the user is researching patents of IBM's directed to the "Clever" project, then the user's movement vector would tilt (lead) along the axis based on the word "Clever". Hence, by observing that two pages were retrieved in sequence, then a vector can be determined in space and a next page could be sent which would be reached typically by inertia (and a lengthy search). Hence, by retrieving two pages and each page has a position in space, then a vector can be formed based on the two points and the vector can be projected in the direction of time.

It is noted again that the invention can cache a plurality of images and is not limited to merely caching only the one image with the highest probability. Hence, the "depth" of the prediction can be configurable (e.g., similar to the "Preferences" features typically found at the Web Browsers today, the "Preferences" at the server side could be configured to cache more (or less) images and to recycle the images more or less often). Hence, a "Predictive Web Cache" feature/object could be found at the server side which could be configurable by the user or system designer.

It is further noted that the prediction capability of the invention may be based on the last document accessed, or based on the last plurality (e.g., 5, 10, 100, etc.) of documents. Thus, a likelihood function at the server side (of the Web) is applied, which is most predictive of the next document to be requested, whether it be the last page or the last several pages.

Fourth Preferred Embodiment

Figure 10:
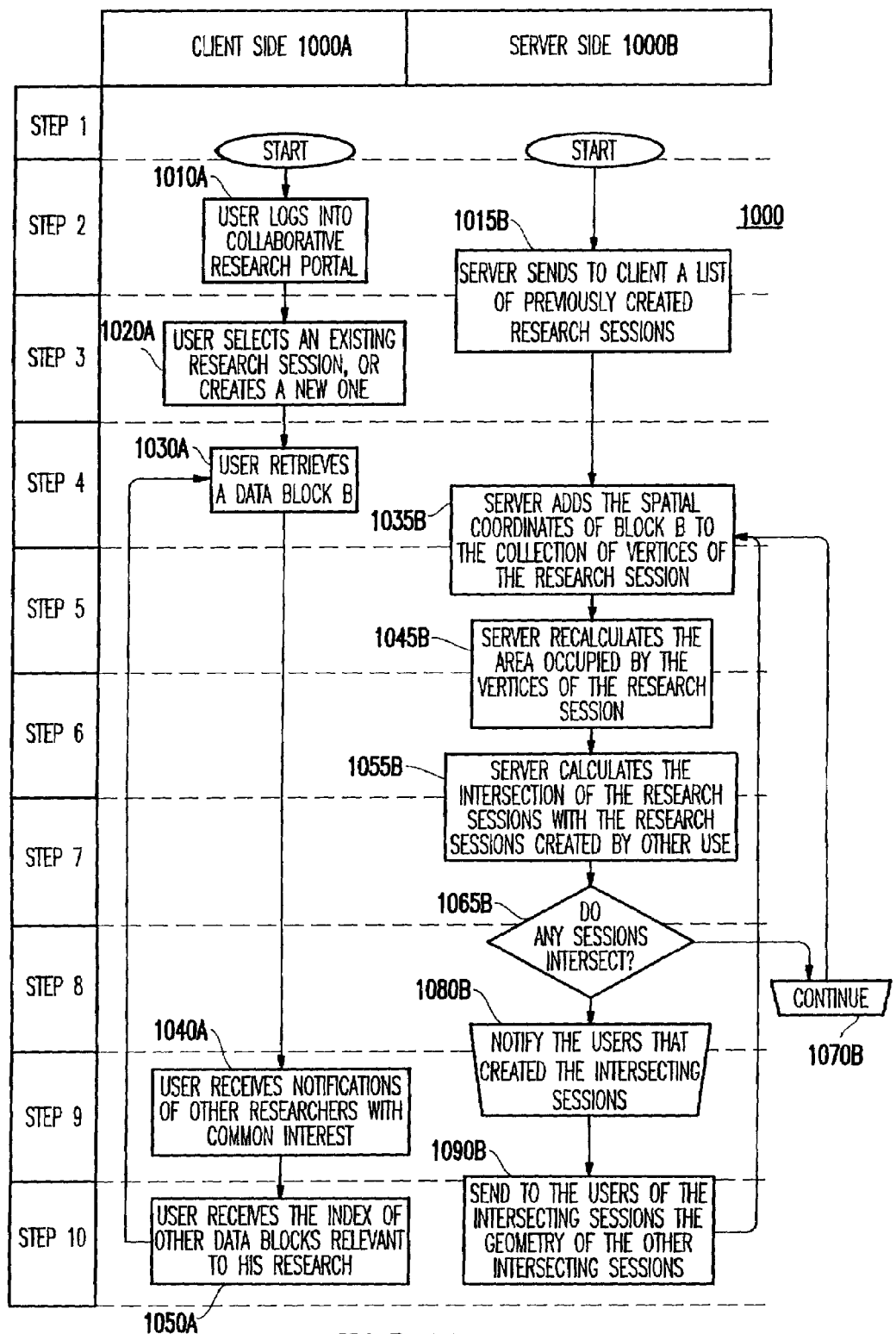
FIG. 10 illustrates a flowchart of a collaborative Web search method 1000 according to the present invention.

Turning now to FIG. 10, a fourth embodiment of the present invention is described hereinbelow which is directed to a collaborative Web search portal according to the present invention. This aspect allows several human researchers to engage in collaborative research.

This aspect of the invention developed out of a desire in the assignee's company to link together and leverage researchers' (in numerous research centers around the world) efforts in common fields. As such, the present inventor recognized that it would be very beneficial to enable researchers to browse the Web using this portal.

Hitherto the invention, there was no facility to search the right project page, etc. since there was no optimum organization of the material to enable a researcher to find other researchers in the same area. Thus, with this aspect, the Web can be browsed using this portal and such similar researchers can be found. Additionally, this aspect runs the indexing procedure described above to find such similar papers and researchers, and thus is available to the server.

In this aspect, which uses a graphical user interface (GUI) similar to those of FIGS. 7 and 8, coordinates are determined for the pages which are served by the server (e.g., retrieved by the researcher) and then maps these coordinates into a space. For example, if there are three dimensions, then an image of a solid is provided/displayed, whereas four or more dimensions will result in a hybrid image on the GUI.

Preferably, the users of this portal are registered users (e.g., similar to Yahoo!) so that the users' access can be restricted (e.g., access restricted only to a certain company's researchers or the like). Further, another researcher doing similar research and also housing the invention and connected to the Web through the portal would be allowed to know of similar users and the server would automatically send messages of the existence of such similar users (e.g., each system being provided with a point of insertion on the network) and enable them to trade the documents that each user has already retrieved. This concept can be thought of simplistically as "trading bookmarks."

The inventive operation may be performed while the users are browsing, or the server may store the other users' sessions while a particular user is off-line and then the server may inform the user automatically when the user comes on-line again that other researchers have been researching a particular area within the last few days, weeks, months, etc. Hence, the user can compare the intersection of the research areas of the other researchers with his own.

If the collection of the documents that the user has retrieved is very similar to the collection that another user has retrieved, then the intersection area is relatively larger. Hence, an affinity with another researcher can be determined, and it can be determined where the other closely-affine researcher has been (e.g., researching an area) that a user has not been. Hence, some interesting material can potentially be found. Then, the user can go to such areas/documents. Thus, a "peer bookmark" can be created and the user can follow other researchers' (e.g., peers) "bookmarks" to supplement and further the user's own research.

Hence, this aspect correlates the usage habits of each human researcher and notifies a researcher of a given topic that other researchers are currently working in related topics. This facility may be used by researchers to find potential collaborators for a research task, and can be used in knowledge management applications at research institutions.

Thus, the collaborative Web search portal is a facility with which Web users can discover other user with similar interests. The measure of proximity among users is a function of distance which is derived from both the N-dimensional mapping scheme and the trails index described above. This non-Euclidean distance function can be expressed as:

$$S(P1, P2)=D(P1, P2)-T(P1, P2)$$

where S is the non-Euclidean distance of the two points p1 and p2 in hyperspace, and D is the Euclidean between points p1 and p2, given by the formula below $$D(P1, P2)=\sqrt{SD(P1^D-P2^D)^2}$$

where T is the Trail estimate between points p1 and p2 calculated as explained above.

The estimate S is used in the collaborative Web portal to estimate the proximity between any two users. The portal allows a user to subscribe to the proximity of another user, to initiate a chat online and to exchange a variety of information with other users.

One of the particular kinds of information exchange which is particular to the inventive collaborative Web portal is a "trail of research." A trail of research is a specific sequence of bookmarks that lead a researcher to a specific point in cyberspace. The collaborative Web portal is shown in the right side of the graphical user interface of FIGS. 7 and 8 at areas 730 and 830 and make use of windows 740, 840 and trails 750, 850.

Turning to FIG. 10, the operations on the client side 1000A and server side 1000B are shown.

First, regarding the client side 1000A, first the user logs into the collaborative research portal according to the invention (step 1010A).

In step 1020A, the user selects an existing research session, or creates a new one.

In step 1030A, the user retrieves a data block B.

In step 1040A, the user receives notifications of other researchers with a common interest.

In step 1050A, the user receives the index of other data blocks relevant to his research.

On the server side 1000B, after step 1010A by the client, the server sends to the client a list of previously created research sessions (step 1015B).

In step 1035B, after steps 1020A and 1030A by the client, the server adds the spatial coordinates of block B to the collection of vertices to the research session.

Then, in step 1045B, the server recalculates the areas occupied by the vertices of the research session.

In step 1055B, the servers calculates the intersection of the research sessions with the research sessions created by other users.

In step 1065B, it is determined whether any sessions intersect. If "NO", then the process continues to step 1070B and loops back to step 1035B.

If "YES" in step 1065B, then in step 1080B, the server notifies the users that created the intersecting sessions, and then in step 1090B the server sends to the users of the intersecting session the geometry of the other intersecting sessions.

Thus, this aspect allows several human researchers to engage in collaborative research and notifies researchers of other researchers and their efforts in a common area of interest.

FIG. 11 illustrates a typical hardware configuration of an information handling/computer system usable with the invention and which preferably has at least one processor or central processing unit (CPU) 1111.

The CPUs 1111 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 1111 and hardware above, to perform the method of the invention.

This signal-bearing media may include, for example, a RAM contained within the CPU 1111, as represented by the fast-access storage for example. Alternatively, the instructions may be contained in another signal-bearing media, such as a magnetic data storage diskette 1200 (FIG. 12), directly or indirectly accessible by the CPU 1111.

Whether contained in the diskette 1200, the computer/CPU 1111, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

While the invention has been described in terms of several preferred embodiments, those skilled in the art will recognize that the invention can be practiced with modification within the spirit and scope of the appended claims.

What is claimed is:

1. A computer implemented method of navigating data blocks, comprising:
   opening a first data block of a plurality of data blocks of interest, said plurality of data blocks being spatially indexed in N dimensions;
   viewing a closeness relationship between said first data block opened and a second plurality of data blocks based on their content;
   accessing a second data block of said second plurality of data blocks which is viewed to be closest to said first data block; and
   spatially indexing a collection of data blocks using a collection of text strings 1 to N as a search criteria,
   wherein said spatially indexing includes:
      determining whether an index record i is less than a number M of blocks in the database and if so setting a number j to 0;
      determining whether j is less than the number N of keywords in a search corpus, and if so, calculating a search result Rj as a number of occurrences of word Wj in the data block B(i);
      storing the search result Rj in an index of block B(i); and
      incrementing j by "1" and determining whether j is less than N.

2. The method of claim 1, wherein a user views said first data block and views its relationship with other data blocks based on a calculation of a distance function, and without traversing a hypertext link, and without subsequently accessing a prior search results page.

3. The method of claim 2, wherein said distance function comprises:
a distance function in Euclidean space.

4. The method of claim 1, further comprising:
each time a data block is accessed, building a proximity list indicating a closeness of another plurality of data blocks to the data block accessed currently, such that the user traverses data blocks horizontally to find a most relevant data block to information sought.

5. The method of claim 1, wherein N is a number of words or subjects in a selected corpus.

6. The method of claim 1, further comprising:
inputting, by a user, an input indicating a search to be performed, the input including a collection of data blocks which are to be indexed, said data blocks selectively containing data, metadata, and links to other data blocks.

7. The method of claim 6, wherein the user further inputs a search depth defining how many links are to be followed during a search process and a collection of text strings 1 to N is input, said text strings being used as search criteria in a spatial indexing process.

8. The method of claim 7, further comprising:
creating, for each data block given as an input, an index record for storing search results which relate each said data block to each of the strings in the collection; and
creating a global index record array which contains index records for each of the data blocks given as an input.

9. The method of claim 1, further comprising:
calculating and displaying a proximity list for a data block.

10. The method of claim 1, further comprising:
positioning, by the user, a search focus and directing coordinates of a search.

11. The method of claim 1, further comprising:
providing a graphical user interface which shows a projection of the N-dimensional space into a plurality of dimensions.

12. The method of claim 11, further comprising:
displaying the projection in three dimensions obtained by first selecting all data blocks in the space which have a non-zero value for coordinates (x, y, z), where x, y, and z are search criteria, and then by making a value of all other coordinates equal to zero.

13. The method of claim 12, further comprising:
displaying search results in a scatter-plot, thereby to reveal a geometric solid with dense and sparse areas, such that the solid is oriented in the three axes, and points which are at the center are related to all three subjects and such that points with a relatively high value in one axis, and relatively low values in the remaining axes will contain data blocks which are relevant only to the term relevant to the one axis, but not to terms relevant to the remaining axes.

14. The method of claim 13, wherein most significant Web pages are displayed in a most densely populated area that is not skewed towards any particular axis, and
wherein a current position of the search is shown in the scatter-plot, such that a user navigates documents in the scatter-plot using a hand-held input mechanism.

15. The method of claim 14, wherein said hand-held input mechanism comprises at least one of a mouse, a touchpad, a light pointer, a keyboard, and a joy stick.

16. The method of claim 14, further comprising:
as the user navigates the three dimensional scatter-plot, changing a current position and a proximity list.

17. The method of claim 16, wherein, during a spatial search, the user positions the current position in a center of the most densely populated area.

18. The method of claim 1, wherein said data blocks comprise documents, said method further comprising:
selectively providing documents with or without any inter-document links.

19. The method of claim 1, wherein said viewing comprises:
displaying information according to a location in an N-dimensional space.

20. The method of claim 1, wherein said closeness relationship comprises:
a relationship of a Euclidean distance between points in an N-dimensional space.

21. The method of claim 1, further comprising:
reading an input data block B(c);
reading search results R1 to Rn stored in an index in block B;
setting i to "1", and determining whether i is less than a number M of blocks in the database and if so, setting j to 1 and a distance to 0;
determining whether j is less than a number N of key words in a search corpus, and if so incrementing the distance to a sum of a previous distance and an absolute value of a difference between a result Rj of block Bc and the result Rj of block Bj, and incrementing j.

22. The method of claim 1, wherein N is a number of words or subjects in a selected corpus, and
wherein said viewing includes displaying information according to a location in an N-dimensional space, and
wherein said closeness relationship includes a relationship of a Euclidean distance between points in the N-dimensional space.

23. A computer implemented method of navigating data blocks, comprising:
opening a first data block of a plurality of data blocks of interest, said plurality of data blocks being spatially indexed in N dimensions;
viewing a closeness relationship between said first data block opened and a second plurality of data blocks based on their content;
accessing a second data block of said second plurality of data blocks which is viewed to be closest to said first data block;
inputting, by a user, an input indicating a search to be performed, the input including a collection of data blocks which are to be indexed, said data blocks selectively containing data, metadata, and links to other data blocks;
wherein the user further inputs a search depth defining how many links are to be followed during a search process and a collection of text strings 1 to N is input, said text strings being used as search criteria in a spatial indexing process,
creating, for each data block given as an input, an index record for storing search results which relate each said data block to each of the strings in the collection; and
creating a global index record array which contains index records for each of the data blocks given as an input,
wherein said indexing of the data blocks includes:
determining whether an index record i is less than a number M of blocks in the database and if so setting a number j to 0;
determining whether j is less than the number N of keywords in a search corpus, and if so, calculating a search result Rj as a number of occurrences of word Wj in the data block B(i);

storing the search result Rj in the index of block B(i); and incrementing j by "1" and determining whether j is less than N.

24. The method of claim 23, further comprising:

if j is determined to be less than N, incrementing the index record i and determining whether i is less than the number M of blocks in the database.

25. The method of claim 24, further comprising:

if i is not less than M, then storing a vector R( ) in the index of each block B(i) as a spatial coordinate of each document Bi.

26. A computer implemented method of navigating data blocks, comprising:

opening a first data block of a plurality of data blocks of interest, said plurality of data blocks being spatially indexed in N dimensions;

viewing a closeness relationship between said first data block opened and a second plurality of data blocks based on their content;

accessing a second data block of said second plurality of data blocks which is viewed to be closest to said first data block; and calculating and displaying a proximity list for a data block, said calculating comprising:

reading an input data block B(c);

reading search results R1 to Rn stored in the index in block B;

setting i to "1", and determining whether i is less than a number M of blocks in the database and if so, setting j to 1 and a distance to 0;

determining whether j is less than a number N of key words in a search corpus, and if so incrementing the distance to a sum of a previous distance and an absolute value of a difference between a result Rj of block Bc and the result Rj of block Bj, and incrementing j.

27. The method of claim 26, further comprising:

if j is determined to be not less than N, then incrementing i and again determining if i is less than M.

28. The method of claim 26, further comprising:

if it is determined that i is not less than M, then building a proximity list by listing the data blocks B(i) wherein 0<i<M by ascending order according to a value of distance (i), thereby to calculate the proximity list for the data block.

* * * * *